E. & T. FAIRBANKS.
Weighing Heavy Bodies.
No. 122.
2 Sheets—Sheet 1.
Patented Feb. 10, 1837.
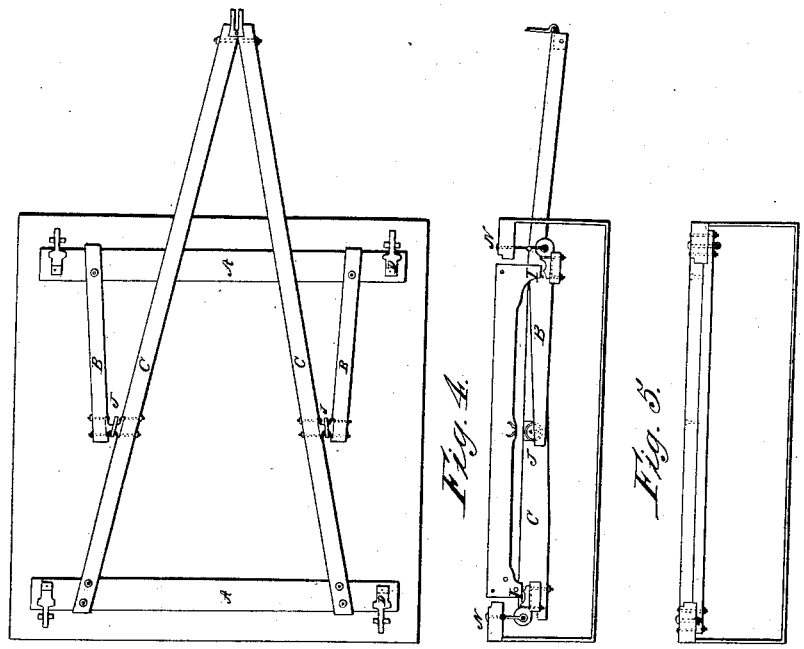
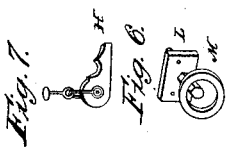
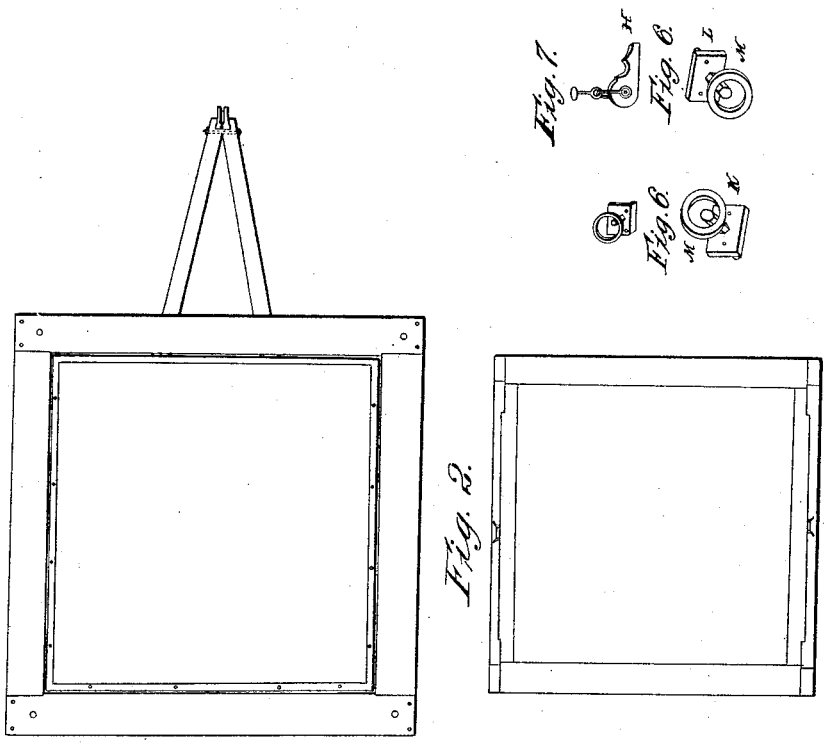
Witnesses.
Luther Jewett
Hiram Knapp
Inventor.
Erastus Fairbanks.
Thaddeus Fairbanks.

2 Sheets—Sheet 2.

E. & T. FAIRBANKS.
Weighing Heavy Bodies.

No. 122.

Patented Feb. 10, 1837.

Witnesses.
Luther Jewett.
Hiram Knapp.

Inventor:
Erastus Fairbanks.
Thaddeus Fairbanks.

UNITED STATES PATENT OFFICE.

ERASTUS FAIRBANKS AND THADDEUS FAIRBANKS, OF ST. JOHNSBURY, VERMONT.

IMPROVEMENT IN THE MACHINE FOR WEIGHING HEAVY BODIES

For which Letters Patent were granted, dated February 21, 1832, and subsequently canceled on account of a defective specification, and new Letters Patent granted, dated March 6, 1834, which new Letters Patent are hereby canceled on account of a defective specification.

Specification forming part of Letters Patent No. 122, dated February 10, 1837.

*To all whom it may concern:*

Be it known that we, ERASTUS FAIRBANKS and THADDEUS FAIRBANKS, of St. Johnsbury, in the county of Caledonia and State of Vermont, have made certain improvements in the machine for weighing heavy bodies in addition to those formerly made by us, and for which we obtained Letters Patent bearing date the 13th day of June, 1831; and we do hereby declare that the following is a full and exact description of our said improvement, reference being had to the drawings which accompany this specification, and make part of the same; and we do further declare that in these drawings and this description we have represented and described many parts which are common to other machines for the same purpose, and are found in that patented by us as aforesaid, which we have done for the purpose of more clearly explaining those parts which we believe to be new and of our own invention, and which are distinctly set forth in the claim hereunto appended.

Figure 2:
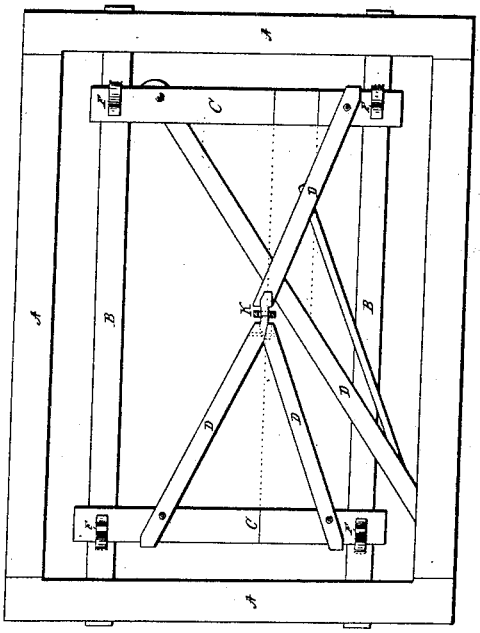
Figure 1:
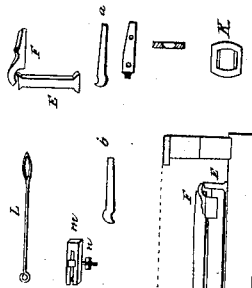
Figure 1:
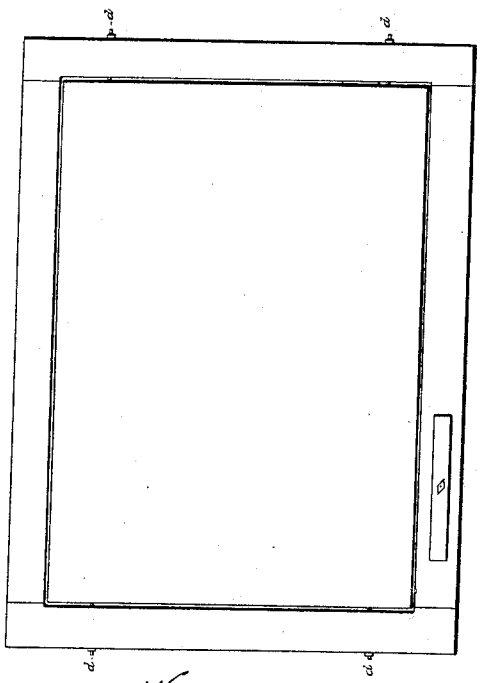

Figure 1 represents a plan of the machine, the arrangement of the levers and their appendages being hid by the platform. Fig. 2 represents those parts which are exposed to view by removing the platform.

A A A A is the exterior frame, made of timber or other suitable material; B B, two sills or timbers extending lengthwise of the frame, and which sustain it and the other parts of the apparatus.

C C are two pieces of wood or of metal, which are denominated "rockers," and which have the levers D D firmly attached and rest upon four knife-edge fulcra or hinges.

Figure 3:
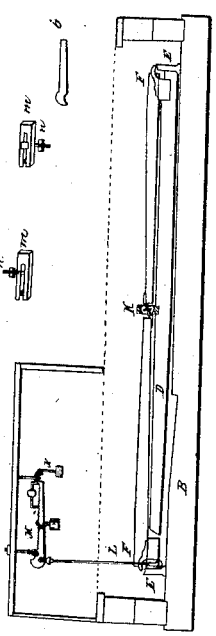

E E, Fig. 3, are standards which form the lower part of these fulcra or hinges, and are supported by the bed-sills B B. One of these standards is drawn to a larger scale in the detached representation, the top being indented for the purpose of receiving one of the knife-edges of the fulcra or hinges. In fixing these standards to the sills they are not firmly attached, but are allowed to have a vibratory motion upon their feet or base lengthwise of the machine, which motion admits of the knife-edge adapting itself perfectly without cramping or binding.

F F are the hinges or those parts of the fulcra which are firmly attached to the rockers C C, one of which is also seen in the detached drawings, with one of its knife-edges resting upon the standard E. Upon the upper side of each of these hinges is formed its other knife-edge, upon which the platform rests, which is received by the pieces of steel, cast-iron, or other metal placed for that purpose on the under side of the timbers of the platform, as shown at H H, Fig. 4. The hinges or fulcra made in the way described are designed to be used in pairs, as seen in Fig. 2, the knife-edges all ranging on parallel lines.

The middle fulcrum, K, is formed by the pieces shown in the detached drawings, *a* and *b*, resting in the ring or quadrangle K. The piece *a* is bolted to the upper side of the longer lever, D, having a knife-edge suspension formed at the projecting end, on which hangs the ring or quadrangle K. The piece *b* is bolted to the under side of the shorter lever, its projecting knife-edge resting in the lower cavity of the ring or quadrangle K, thus connecting the two levers at a point equidistant from their axes by means of a pendulous ring hanging upon knife-edges. In the side elevation, Fig. 3, the ring or quadrangle K is supposed to be cut vertically for the purpose of showing the knife-edges *a* and *b*, which bear upon its upper and lower curve.

The longer lever, D, is lengthened out so as to extend under the edge of one side of the frame, where it is connected with the balance or steelyard.

Fig. 3 is a side elevation of the machine. The lever D is here seen extended to the rod L, the lower end of which, in the form of a hook, passes under a knife-edge at the end of this lever. The fixture on the end of the lever of which the knife-edge forms a part is seen in the detached drawing, *m m*. It is fastened on the under side of the lever by the screw and nut *n*, admitting, as will be seen by inspection, of its being adjusted to its place with great precision.

In order to prevent that oscillation or thrust of the platform to which it may be subjected by the drawing of a load onto it or by shifting it when on, we attach jointed rods, chains, or links to the end timbers of the frame, which rods, chains, or links have hooks or loops upon their ends adapted to pass into staples affixed for that purpose on the under side of the platform, still allowing it to descend the slight distance required in weighing, while they effectually prevent its striking or rubbing against the frame. The usual modes of placing these rods, chains, or links are shown in the drawings, and are marked $d\ d\ d\ d$.

Any steelyard or common balance may be connected to the lever D by means of a rod, L. M represents the rod and a steelyard or balance with weights suspended thereto by the rod N, and also having a movable poise which, although appended to the drawings, do not in any way appertain to the improvements intended to be now patented, and need not be here described.

When we make the weighing-machine for the use of warehouses, stores, &c., for the purpose of general weighing we sometimes modify the form of the apparatus and the direction of the levers in such a way as to render it in some respects more convenient than the one just described. The accompanying drawing No. 2 will serve to exemplify this kind of modification.

Figure 4:
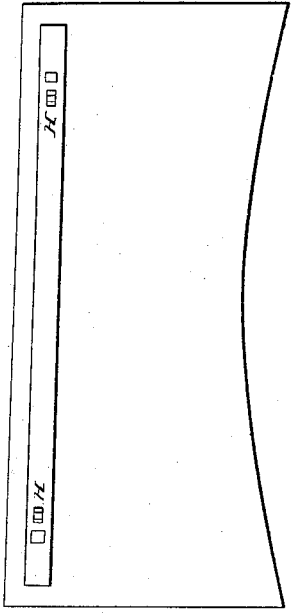

Fig. 1 is a plan of the machine with the platform in its place; Fig. 2, a view of the under side of the platform; Fig. 3, a plan of the machine where the platform is removed; Fig. 4, a lateral view, certain parts being removed to exhibit the general arrangement, with a section of the platform in its place. Fig. 5 shows a section of the box and the frame which surrounds it to receive the platform; Fig. 6, the knife-edge suspension at the junction of the levers; Fig. 7, the hinge which is bolted onto the rocker, and which is suspended from the frame which surrounds the platform by a knife-edge suspension instead of resting upon a standard, as in the former arrangement.

In each of the figures the same letters are employed to designate similar parts.

A A are the rockers, upon one of which is fixed the short lever B B, and upon the other the longer lever, C C. Upon the rockers A A are bolted, near their ends, the hinges D D, having upon them knife-edges H, Fig. 7, for the bearings I I of the platform to rest on. The mode of forming the knife-edge bearings at the junction of the two levers J J is shown at Fig. 6, one piece, K, with its knife-edge, being attached to the shorter, and another, L, with its knife-edge to the longer, levers, and a circle or ring, M, being substituted for the quadrangle or ring K in the first modification. This method of connecting the levers by means of knife-edge bearings resting in pendulous hooks or circles admits of a free motion corresponding with that of the hinges or fulcra.

N N are the heads of the bolts and loops which form a part of the knife-edge suspension of the hinges or fulcra. The rod leading from the longer lever, $c\ c$, to the balance has its suspension formed in the manner essentially the same with that before described.

From the foregoing description it will be seen that in the different modifications the several bearings upon which the machine moves are all knife-edges placed on parallel lines and resting upon pendulous or vibratory supports in such a manner as entirely to avoid all friction and all resistance by opposing tendencies.

It is obvious that machines constructed upon this principle may be variously modified—as, for instance, if the levers be constructed of iron the knife-edges may be formed upon them, or the hinges or fulcra, or center connection, may be formed by inserting pivots with knife-edges hanging in single loops, while a brace or bar extending across and forming a triangular lever may answer the purpose of the pieces denominated "rockers."

What we claim as our invention and as an improvement upon the machine formerly patented by us, is—

The variation in the manner of arranging the levers, as described in Figs. 3 and 4, drawing 2, the arrangement being that of having the longer lever (with its rocker) triangular, extending through the center of the machine, and the shorter lever, while it forms but one power, is constructed with two arms so fitted as to be suspended to the longer lever at a point equidistant from the axis of each, thus preserving the simple combination of two levers, as claimed in our former patent.

ERASTUS FAIRBANKS.
THADDEUS FAIRBANKS.

Witnesses:
LUTHER JEWETT,
HIRAM KNAPP.